(12) United States Patent
Petrov et al.

(10) Patent No.: US 9,146,762 B2
(45) Date of Patent: Sep. 29, 2015

(54) SPECIALIZED VIRTUAL MACHINE TO VIRTUALIZE HARDWARE RESOURCE FOR GUEST VIRTUAL MACHINES

(75) Inventors: Julian Petrov, Pembroke Pines, FL (US); Sandy Stutsman, Westford, MA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 443 days.

(21) Appl. No.: 13/592,891

(22) Filed: Aug. 23, 2012

(65) Prior Publication Data

US 2014/0055466 A1 Feb. 27, 2014

(51) Int. Cl.
G06F 13/12 (2006.01)
G06F 13/38 (2006.01)
G06F 9/455 (2006.01)
G09G 5/36 (2006.01)

(52) U.S. Cl.
CPC ............ *G06F 9/45533* (2013.01); *G09G 5/363* (2013.01)

(58) Field of Classification Search
CPC ...................................... G09G 5/363
USPC .......................................... 710/72
See application file for complete search history.

(56) References Cited

U.S. PATENT DOCUMENTS

| | | |
|---|---|---|
| 2010/0262722 A1 | 10/2010 | Vauthier et al. |
| 2011/0050712 A1 | 3/2011 | Jackson |
| 2011/0102443 A1 | 5/2011 | Dror et al. |
| 2011/0145821 A1 | 6/2011 | Philipson et al. |
| 2011/0145886 A1 | 6/2011 | McKenzie et al. |
| 2011/0145916 A1* | 6/2011 | McKenzie et al. ............... 726/19 |
| 2013/0229421 A1* | 9/2013 | Cheng et al. .................. 345/522 |

OTHER PUBLICATIONS

Wine (software), From Wikipedia, the free encyclopedia, http://en.wikipedia.org/w/index.php?title=Wine_(software) &oldid=506949593 Dec. 31, 2012, pp. 1-12.

* cited by examiner

*Primary Examiner* — Chun-Kuan Lee
(74) *Attorney, Agent, or Firm* — BainwoodHuang

(57) ABSTRACT

A computing system includes a graphics processing unit (GPU) and main processing circuitry to execute computer program instructions forming a hypervisor, a control virtual machine (VM) and a specialized rendering VM for graphics processing. An application program of a guest VM generates graphics commands and data according to a graphics API such as Direct 3D. The rendering VM includes a graphics driver native to the GPU and is assigned pass-through access to the GPU by the control VM. The rendering VM receives the graphics information from the application program via an inter-VM communication channel, and it uses the graphics driver to control the GPU to perform graphics rendering. The use of the rendering VM enables native graphics performance to be achieved without constraining the control VM to use a compatible operating system. The technique is generally applicable to virtualization of hardware resources by specialized VMs.

16 Claims, 4 Drawing Sheets

SPECIALIZED VIRTUAL MACHINE TO VIRTUALIZE HARDWARE RESOURCE FOR GUEST VIRTUAL MACHINES

BACKGROUND

The present invention is related to the field of computer systems, and in one aspect to processing of specialized hardware resources such as computer graphics units.

In the field of computer graphics, it is known to use specialized graphics processing units or GPUs to provide hardware-based acceleration of certain graphics operations. As an example, a contemporary GPU may perform operations such as texture mapping, high-speed polygon rendering, and shading in hardware circuitry having a highly parallel structure for high processing throughput. Processing performed by a GPU is generally for purposes of rendering graphical images of an application program on a graphical display. GPUs are especially useful for many graphics-intensive computer applications, including video games and high-end graphical composition and editing tools for example.

SUMMARY

There can be challenges to efficient use of a GPU or similar specialized hardware resource in computer systems that employ "virtualization" technology, i.e., computer systems having host hardware and software that supports execution of multiple virtual computers or "virtual machines" (VMs). A GPU is not divisible like memory or storage, and thus cannot be assigned for use by different VMs on that basis.

One approach to GPU virtualization is used in virtual-computing systems based on the so-called XEN architecture, which features an open-source hypervisor and a control VM running the Linux operating system. Linux provides native support for a graphics application programming interface (API) known as OpenGL. Systems running the Windows® operating system generally utilize a different graphics API of a family referred to as DirectX. In particular, a specific DirectX API used for three-dimensional graphics is referred to as "Direct 3D" or "D3D". In a XEN virtual computing system in which guest VMs are running Windows, it has been necessary to employ an open-source conversion program known as "Wine" to provide conversion between the D3D API and OpenGL. The Wine program is deployed in the control VM, and the guest VMs are configured with special drivers that route D3D function calls generated by application programs to the control VM. At the control VM, Wine processes the D3D function calls using OpenGL operations.

However, the use of a converter and separate graphics API (such as Wine and OpenGL) can impose performance penalties as compared to systems using a native D3D driver for the GPU. First is the conversion process itself, which imparts extra delay and may reduce graphics throughput. Additionally, functions provided by D3D but not by OpenGL must be executed in some alternative manner, such as some form of emulation for example, which can greatly reduce performance over GPU-assisted execution. It would be desirable for Linux-based virtual computing systems such as XEN systems to provide support for the Windows D3D API without unduly sacrificing graphics performance.

A technique for virtualizing a specialized hardware resource such as graphics hardware is disclosed that overcomes limitations of prior virtualization techniques, such as discussed above, providing for flexibility in deployment without a need for performance-reducing conversion and emulation. While the technique may be particularly useful in open-source platforms such as XEN-based platforms, it has more general applicability to systems based on other architectures.

In one respect, a disclosed computing system includes a graphics processing unit and main processing circuitry that is operative to execute computer program instructions forming a hypervisor, a control virtual machine and a specialized rendering virtual machine used for graphics processing. The hypervisor provides for virtualization of hardware of the computing system as in conventional virtual-computing platforms, while the control virtual machine manages the rendering virtual machine and guest virtual machines of the computing system. The technique supports shared use of the graphics processing unit by application programs of the guest virtual machines that generate graphics information (generally including graphics commands and graphics data) according to a specified graphics API such as the D3D API.

The rendering virtual machine includes a graphics driver that is native to the graphics processing unit, and it is assigned pass-through access to the graphics processing unit by the control virtual machine. That is, the rendering virtual machine is able to directly communicate with the GPU to control its operation, without virtualization by the hypervisor as is done for other hardware resources. The rendering virtual machine receives graphics information from an application program via an inter-virtual-machine communication channel, and uses the graphics driver to control operation of the graphics processing unit to perform graphics rendering operations based on the graphics information.

Because the rendering VM is separate from the control VM, it can use an operating system that supports the native graphics driver (such as Windows) while the control VM may use a different operating system that may not be compatible with the driver but has other advantages such as open-source availability (such as Linux). The control VM is not directly involved in the graphics processing, so that performance-reducing conversion between different graphics APIs is not necessary. Additionally, due to its specialized nature, the rendering virtual machine may be realized as a relatively low-function machine—it may not require functions such as network access, a complicated file system, a user interface etc. Thus it may use a so-called "embedded" operating system which is less resource-intensive and less expensive than a full-function operating system such as normally used in general-purpose VMs.

The disclosed technique has broader application to virtualization of other types of hardware resources.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
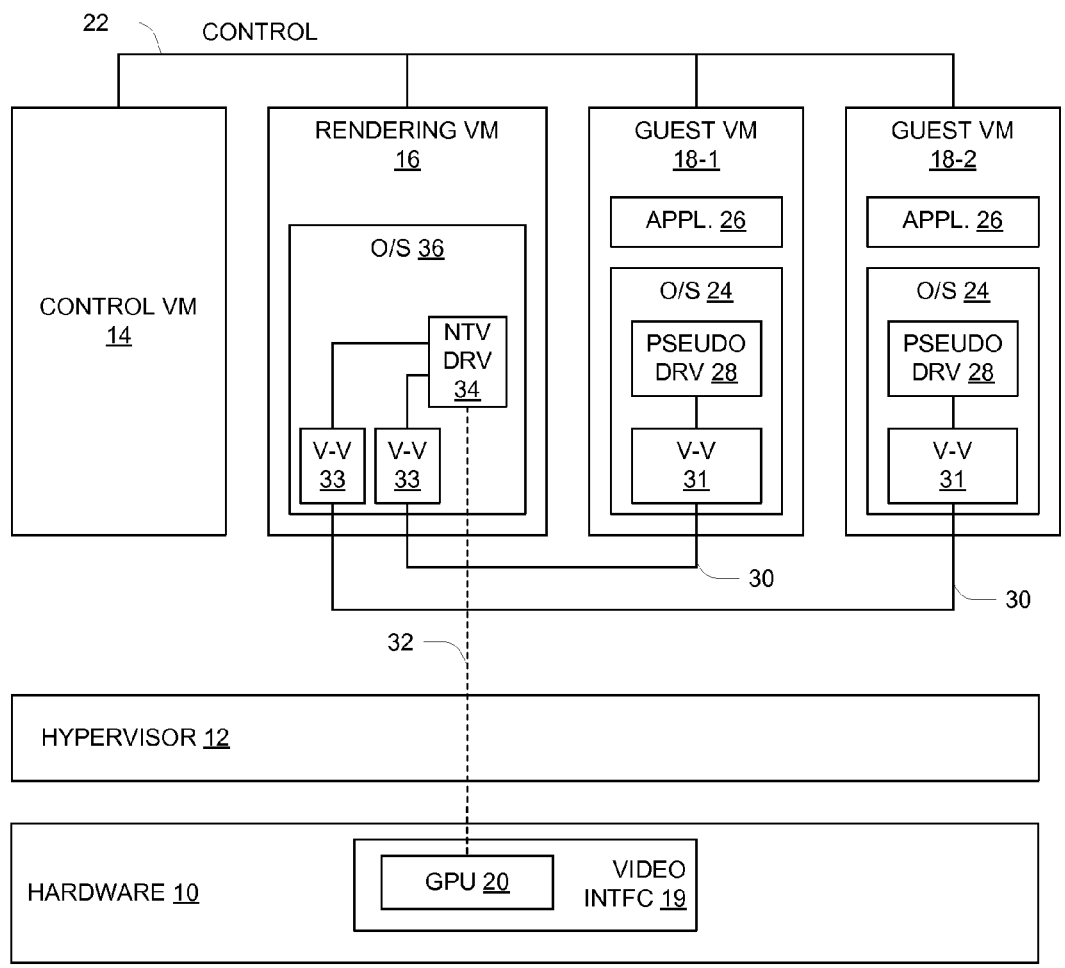
FIG. 1 is a block diagram of a computer system.

FIG. 1 shows a computer having a set of hardware resources (or hardware) 10 and software-implemented components including a hypervisor 12 and a collection of virtual machines (VMs) shown as a control VM 14, a rendering VM 16, and one or more guest VMs 18 (two guest VMs 18-1 and 18-2 shown). The hypervisor 12, the control VM 14 and the rendering VM 16 are privileged system components, meaning that they generally have direct access to some or all of the hardware 10, while the guest VMs 18 are relatively less privileged and rely on virtualization and other functionality of the privileged system components for their use of the hardware 10. The hardware 10 generally includes one or more processors, memory, and one or more high-speed data buses providing functional interconnections for data transfer among these components. For ease of reference herein, the collection of these components is referred to as "main processing circuitry", reflecting the function of processing computer program instructions of software-implemented components including the hypervisor 12 and VMs 14-18. The hardware 10 also generally includes I/O circuitry which may include, for example, network interface circuitry, storage device(s) such as flash memory or magnetic disk(s), and interface circuitry to user interface devices such as a pointing device, keyboard, and graphical display device.

As shown, the hardware 10 includes video interface circuitry (VIDEO INTFC) 19 including a graphics processing unit (GPU) 20. The video interface circuitry 19 provides an interface to a graphical display device such as an LCD display (not shown). The GPU 10 includes circuitry specially tailored to performing graphics rendering operations. Such circuitry may also be referred to as a "graphics accelerator". In particular, in one embodiment the GPU 20 includes a capability of three-dimensional (3-D) rendering.

The control VM 14 is a special VM used for management and control of the computer, including the instantiation of the rendering VM 16 and guest VMs 18 as well as configuration and control of certain aspects of their operation. This control function is indicated in FIG. 1 by control connections 22.

The control VM 14 may be referred to alternatively as a "control domain", "domain 0" or "dom0", the latter designations being applicable in a system in which successively instantiated VMs are given corresponding sequential numbers 0, 1, 2, . . . . The control VM 14 also provides an interface to a human operator of the computer, such as by a "console" or similar user interface program as generally known in the art. In one embodiment, the control VM 14 executes the Linux operating system. Certain specific functions of the control VM 14 are described below. The guest VMs 18 are typically full-function VMs that are preferably as close to fully virtualized as possible, meaning that they can execute software (especially an operating system) with little modification from a non-virtualized form. As shown, each guest VM 18 includes an operating system (O/S) 24 and one or more application programs (APPL) 26. In one embodiment the operating system 24 may be the Windows® operating system as used in personal computers. It should be noted that different guest VMs 18 may execute different types of operating systems 24.

The operating system 24 is shown as including a graphics "pseudo driver" (PSEUDO DRV) 28 that is operatively coupled to the rendering VM 16 via an inter-virtual-machine (inter-VM) communication channel 30. The inter-VM communication channel 30 is realized using a first inter-VM (V TO V) channel interface (V-V) 31 in the guest VM 18 and a second inter-VM channel interface 33 in the rendering VM 16 (these are referred to as "client-type" and "server-type" respectively below). In this respect the operating system 24 is specifically modified for execution in a virtualized computing system such as that of FIG. 1. In a non-virtualized setting, the operating system typically includes a graphics driver operatively coupled directly to graphics processing circuitry such as a GPU to control its execution of graphics operations at a fairly low level (e.g., programming parameters and operation codes, monitoring status and completion of operations, etc). The pseudo driver 28, in contrast, functions primarily to merely transfer graphics commands, responses and data (collectively "graphics information") between the application program 26 and the rendering VM 16 via the inter-VM communication channel 30. Actual processing of graphics commands is performed by the rendering VM 16 and GPU 20 as described below.

The rendering VM 16 is a special-purpose VM providing graphics processing capability to the guest VMs 18. It is assigned direct, "pass-through" access 32 to the GPU 20, meaning that a native driver (NTV DRV) 34 controls and communicates directly with the GPU 20 as in a conventional non-virtualized setting, with no virtualization being provided by the hypervisor 12. The rendering VM 16 employs an operating system 36 that may be relatively less functional than the operating system 26 of the guest VMs 18, because of the special purpose nature of the rendering VM 16. For example, the operating system 36 may not support a conventional file system or rich user interface, and it may support only limited storage and provide little or no user extensibility. In one embodiment, the operating system 36 may be a so-called "embedded" or "real-time" operating system, a type used for a variety of specialized computing devices including cell phones as generally known in the art. In one embodiment, the operating system 36 may be a member of the Windows Embedded family of embedded operating systems.

The operating system 36 is shown as including inter-VM channel interfaces 33 each operatively coupled to a respective inter-VM communication channel 30 and the native driver 34. In operation, each inter-VM channel interface 33 operates complementarily with its corresponding inter-VM channel interface 31, effecting the transfer of graphics information between the native driver 34 and the application programs 26 via the inter-VM communication channels 30.

In FIG. 1, the hypervisor 12 and VMs 14-18 are shown as separate from the hardware 10, which is a typical and useful depiction for purposes of description. It should be understood that these software-implemented components effectively include the main processing circuitry during their execution. Thus the hypervisor 12, for example, includes the main processing circuitry of the hardware 10 when executing instructions of a hypervisor program. A similar description can be applied to the VMs 14-18.

The arrangement of FIG. 1 may be particularly suited for use with application programs 26 having a graphics-intensive workload, such as video games for example. In this case, it may be a personal device such as a desktop, console or mobile platform. Nonetheless, the arrangement may also find use in a server-type computing device, such as a server providing for remote display of rendered graphics for an application program executing on the server. In prior systems, it has been known to provide a graphics driver within a control VM to provide guest VMs with shared access to graphics hardware (e.g., using an inter-VM channel similar to the inter-VM channel 30). Such a control VM may employ the Linux operating system, and with it an open-source graphics driver operating according to the so-called OpenGL application programming interface (API). In contrast, guest VMs may use other operating systems, such as those of the Windows® family, that may use a different graphics API of a proprietary family known as DirectX, one version of which is called Direct 3D or "D3D" and used for 3-dimensional graphics rendering. In these kinds of systems it has been necessary to employ a conversion program known as Wine to convert between the D3D and OpenGL APIs. Because not all graphics functions provided by D3D are available in OpenGL, graphics performance in such systems is typically lower than in non-virtualized systems using native D3D drivers for the graphics hardware.

One of the advantages of the structure of FIG. 1 is the ability to use the native driver 34 for the GPU 20 (e.g., a D3D driver) notwithstanding that the driver may be incompatible with the operating system (e.g., Linux) of the control VM 14. The native driver 34 is placed within the specialized rendering VM 16 which uses a compatible operating system (e.g., Windows), and the control VM 14 establishes the inter-VM communication channels 30 to enable graphics information (e.g., D3D function calls and data) to be transferred between the guest VMs 18 and the shared native driver 34. The native driver 34 is also provided with the pass-through access to the GPU 20 as described above. The use of a Linux-based control VM 14 does not affect graphics performance, because it is not directly involved in graphics processing as in prior systems using OpenGL and Wine.

Figure 2:
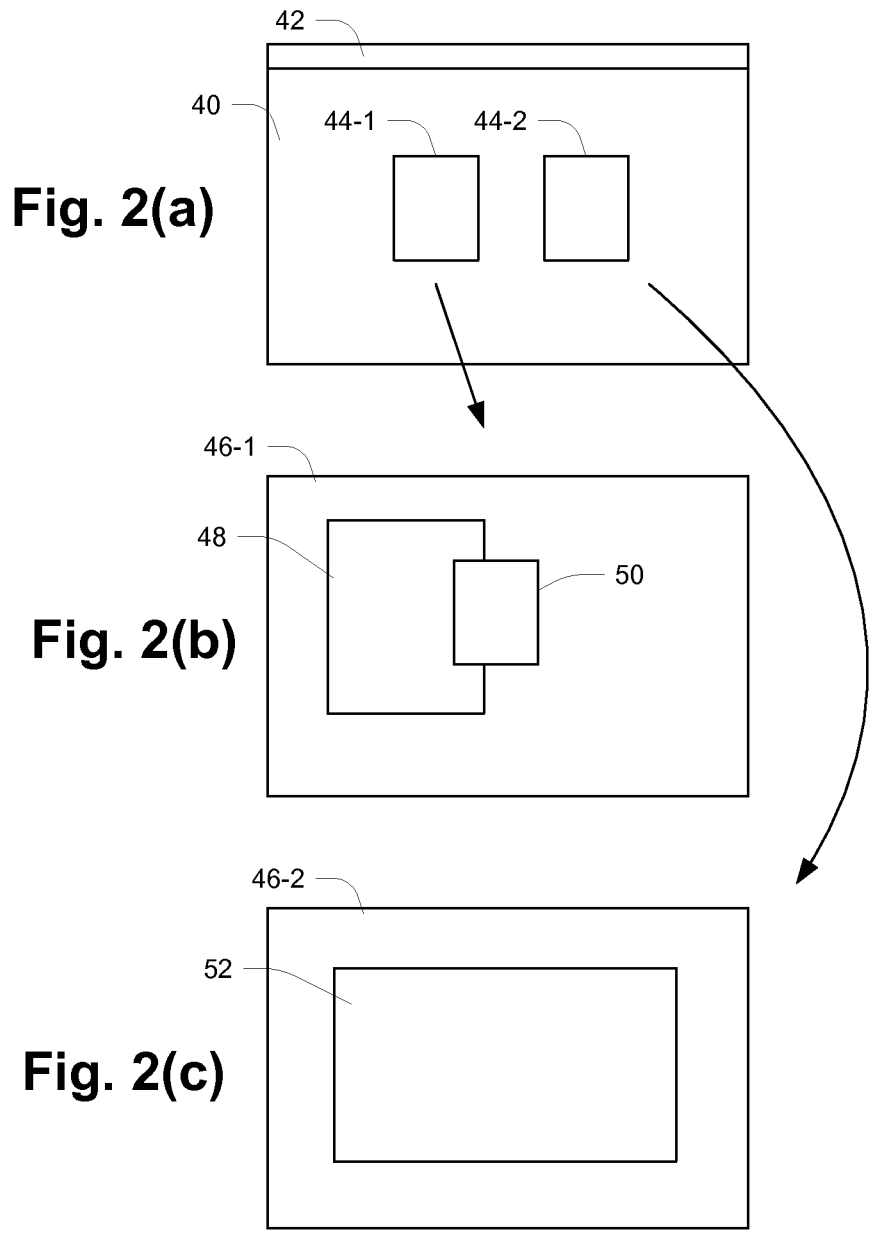
FIGS. 2(a) through 2(c) are schematic depictions of graphical user interface display screens.

FIGS. 2(*a*) through 2(*c*) provide a simplified depiction of operation of the computer system from a user's perspective. In particular, each of these represents a screen of a graphical display device, such as an LCD display, during operation. FIG. 2(*a*) shows a control screen 40 forming part of a user interface for a system control program executed by the control VM 14. Among other things, the screen 40 is used by a user to select which of the guest VMs 18 is in "focus", i.e., has its graphics output appearing on the display device and accepts input from the user input device(s) (keyboard, mouse etc.). The control screen 40 may have an area 42 where control features such as icons, pull-down menus etc. may be located and/or activated from. It may also include respective icons 44 (44-1 and 44-2) representing the VMs that are running (in this case, for the two guest VMs 18-1 and 18-2). A user selects the focus by activating a corresponding icon 44. As shown, activation of the icon 44-1 causes a screen 46-1 for the guest VM 18-1 to be displayed (FIG. 2(*b*)), while activation of the icon 44-2 causes a screen 46-2 for the guest VM 18-2 to be displayed (FIG. 2(*c*)). In the illustrated example, the screen 46-1 includes two windows 48, 50 laid on a desktop background for the guest VM 18-1, while the screen 46-2 shows one large window 52 for guest VM 18-2. With the display in either of the states of FIGS. 2(*b*) and 2(*c*), a user command to change focus may be accomplished using just the keyboard, such as by a sequence of keys representing a system-level control command, or by use of the mouse by bringing it to an edge of the screen to cause a control screen or toolbar to appear.

Figure 3:
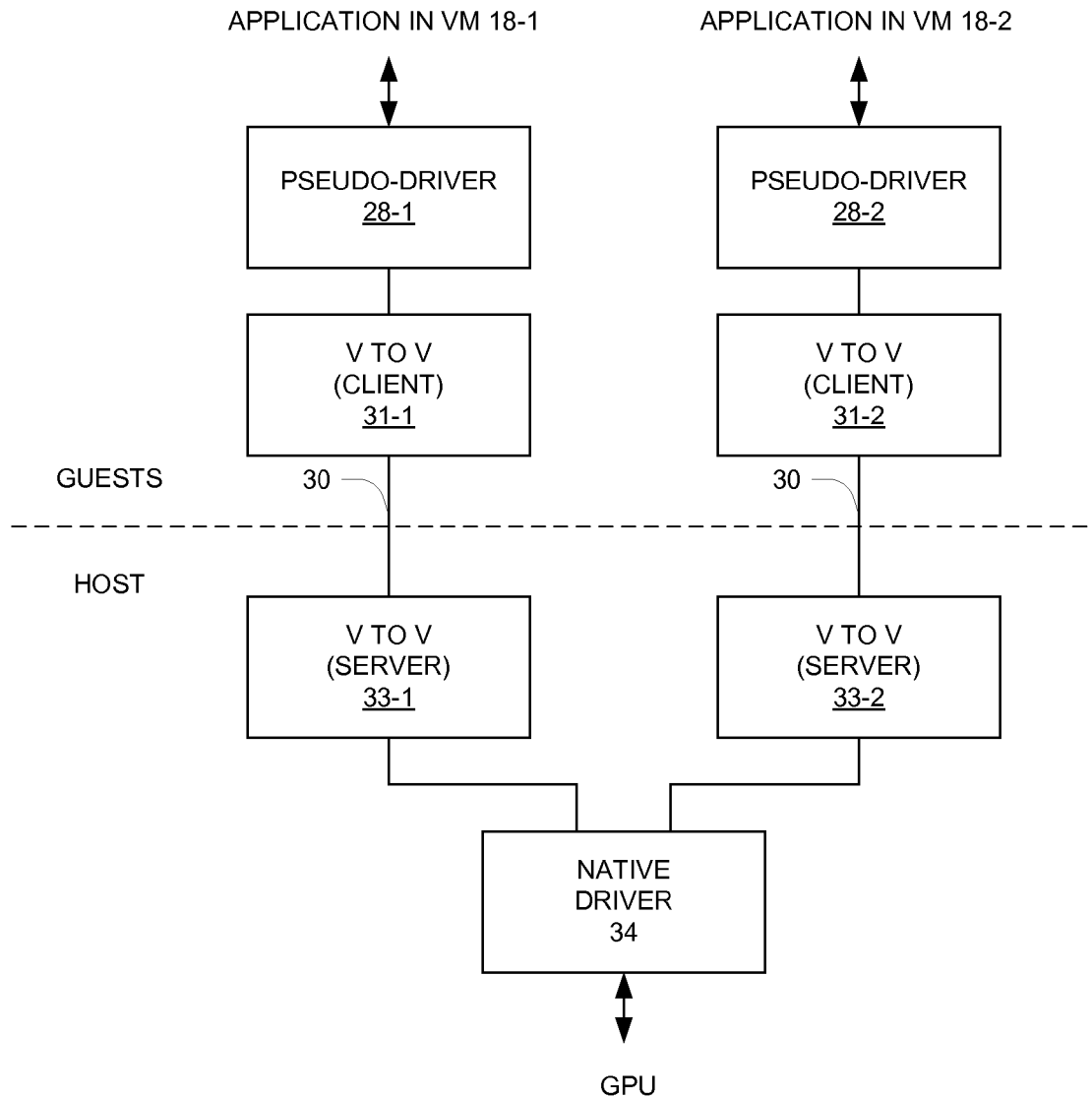
FIG. 3 is block diagram of certain elements of the computer system.

FIG. 3 illustrates the set of components involved in graphics processing, arranged vertically to reflect functional location relative to the application programs 26 and GPU 20 of FIG. 1. At an upper location facing the applications 26 are the pseudo-drivers 28. Each pseudo-driver 28 communicates with a client-type inter-VM interface 31, which in term communicates with a server-type inter-VM interface 33 via the respective inter-VM communication channel 30. Each server-type inter-VM interface 33 communicates with the native driver 34 that controls operation of the GPU 20.

Figure 4:
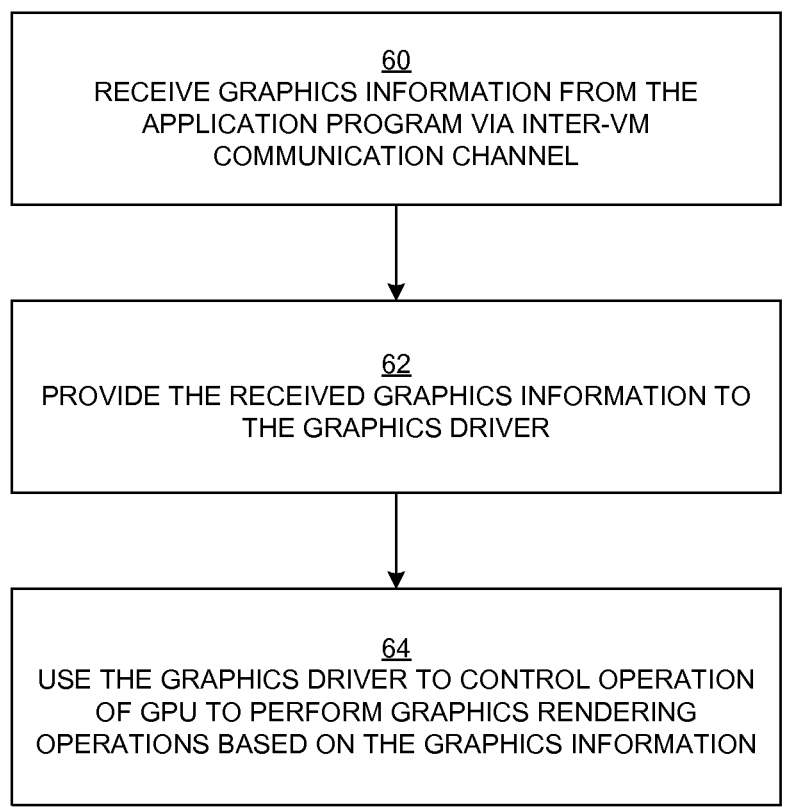
FIG. 4 is a flow diagram of certain operations of the computer system.

FIG. 4 is a simplified flow diagram illustrating pertinent operation of the computer of FIG. 1, specifically graphics-related operation of the rendering VM 16. At 60, the rendering VM 16 receives graphics information from an application program 26 of a guest VM 18 via an inter-VM communications channel 30. The graphics information is in accordance with a graphics API supported by the graphics processing unit 20, e.g., the above-mentioned D3D graphics API. As described above, the rendering VM 16 employs the server-type inter-VM interface 33 to the inter-VM communications channel 30. The graphics information is sent using transport messages of the inter-VM communications channel 30.

At 62, the server-type inter-VM interface 33 passes the received graphics information to the native driver 34.

At 64, the native driver 34 controls operation of the graphics processing unit 20 to perform graphics rendering operations using the received graphics information. This control will be in the form of programming parameters and operation codes, monitoring status and completion of operations, etc. as discussed above.

In a system such as shown in FIG. 1 in which the GPU 20 is part of local video interface circuitry 19, the result of the rendering operations by the GPU 20 may represent a screen to be displayed on a local display device, such as the screens 42, 46 discussed above. In some cases, the result may be used in a different manner. One general alternative is the use of a remote display device, i.e., a local application 26 generates graphics information for a screen to be displayed on a display device attached to another physical computer. In this case, the result of the rendering operations may be returned to the requesting application 26, for example, to enable the application 26 to send the result to the other computer where the result will be displayed. Other back-end processing of the rendering result is possible.

While the above description focuses on methods and apparatus to support graphics operations in particular, these may be slightly generalized to provide for shared access to a hardware resource for other than graphics operations. With respect to GPUs, for example, there is increasing use of contemporary GPUs for non-graphics tasks that employ vector and other calculations that are performed in hardware by the GPU. In this type of use, the GPU may be referred to as a "general-purpose GPU". With respect to the structure of FIG. 1, the only major modification to support such use is that the drivers 28 and 34 support whatever API is used by an application program 24 to access the hardware resource.

The disclosed technique may also be generalized to take advantage of the use of a specialized VM (analogous to the rendering VM 18) that is more compatible with the guest VMs 18 than is the control VM 14. In this respect it is assumed that guest VMs 18 employ an operating system of a first type (such as Windows), while the control VM 14 uses a second operating system of a different type (such as Linux), and that there is either no support or only limited support under the second operating system for a system function that is more fully supported by the first operating system. In this case, the system function (or control software for the system function, such as a device driver) can be deployed on a specialized VM (akin to the rendering VM 16) which runs the first operating system, and an inter-VM communication scheme can be employed to enable the function to be accessed from the guest VMs 18. This arrangement enables a virtualizing computer which is based on the second operating system to support functions of the first operating system in a native fashion.

What is claimed is:

1. A computing system, comprising:
   a graphics processing unit; and
   main processing circuitry operative to execute a set of computer program instructions to form:
   a hypervisor operative to virtualize hardware of the computing system;
   a control virtual machine; and
   a rendering virtual machine, the control virtual machine being operative to manage the rendering virtual machine and a guest virtual machine, the guest virtual machine including an application program generating graphics information, the rendering virtual machine including a graphics driver native to the graphics processing unit and being assigned pass-through access to the graphics processing unit by the control virtual machine, the rendering virtual machine being operative to (i) receive the graphics information from the application program via an inter-virtual-machine communication channel, (ii) provide the received graphics information to the graphics driver, and (iii) use the graphics driver to control operation of the graphics processing unit to perform graphics rendering operations based on the graphics information.

2. A computing system according to claim 1, wherein the guest virtual machine and the rendering virtual machine execute respective operating systems of a first type compatible with the native graphics driver, and the control virtual machine executes an operating system of a second type not compatible with the native graphics driver.

3. A computing system according to claim 1, wherein the application program executes a graphics-intensive workload.

4. A computing system according to claim 3, wherein the graphics-intensive workload includes a video game.

5. A computing system according to claim 3, being a personal desktop or mobile device normally used by a single user.

6. A computing system according to claim 1, wherein the rendering virtual machine executes an embedded operating system.

7. A method of operating a computer system to enable use of a graphics processing unit by an application program executing in a guest virtual machine, comprising:
    by a control virtual machine, assigning pass-through access to the graphics processing unit to a rendering virtual machine, the rendering virtual machine including a graphics driver native to the graphics processing unit; and
    by the rendering virtual machine:
        receiving the graphics information from the application program via an inter-virtual-machine communication channel;
        providing the received graphics information to the graphics driver; and
        using the graphics driver to control operation of the graphics processing unit to perform graphics rendering operations based on the graphics information.

8. A method according to claim 7, wherein the guest virtual machine and the rendering virtual machine execute respective operating systems of a first type compatible with the native graphics driver, and the control virtual machine executes an operating system of a second type not compatible with the native graphics driver.

9. A method according to claim 7, wherein the application program executes a graphics-intensive workload.

10. A method according to claim 9, wherein the graphics-intensive workload includes a video game.

11. A method according to claim 9, wherein the computing system is a personal desktop or mobile device normally used by a single user.

12. A method according to claim 7, wherein the rendering virtual machine executes an embedded operating system.

13. A method of operating a computer system to enable use of a hardware resource by an application program executing in a guest virtual machine, comprising:
    by a control virtual machine, assigning control over operation of the hardware resource to a specialized virtual machine, the specialized virtual machine including a native driver for the hardware resource; and
    by the specialized virtual machine:
        receiving input information for the hardware resource from the application program via an inter-virtual-machine communication channel;
        providing the received input information to the native driver; and
        utilizing the native driver to control operation of the hardware resource using the input information.

14. A method according to claim 13, wherein the hardware resource is a general-purpose graphics processing unit.

15. A method of operating a computer system to enable execution of a system function by an application program executing in a guest virtual machine, comprising:
    by a control virtual machine, assigning control over execution of the system function to a specialized virtual machine, the specialized virtual machine including a software component for controlling execution of the system function, the software component being compatible with respective operating systems of a first type executed by the specialized virtual machine and the guest virtual machine and incompatible with an operating system of a second type executed by the control virtual machine; and
    by the specialized virtual machine:
        receiving input information for the system function from the application program via an inter-virtual-machine communication channel;
        providing the received input information to the software component; and
        utilizing the software component to control execution of the system function of behalf of the application program.

16. A method according to claim 15, wherein the system function includes graphics functions provided by a graphics processing unit and the software component is a driver for the graphics processing unit, the driver being native to the graphics processing unit and operating according to a first application programming interface used by the application program to invoke the graphics functions, and wherein the operating system of the second type natively supports a second application programming interface that lacks at least selected ones of the graphics functions.

* * * * *